United States Patent [19]
Murayama

[11] Patent Number: 5,898,799
[45] Date of Patent: Apr. 27, 1999

[54] IMAGE SIGNAL CODING AND DECODING METHOD AND APPARATUS

[75] Inventor: Jun Murayama, Tokyo, Japan

[73] Assignee: Sony Corporation, Tokyo, Japan

[21] Appl. No.: 08/921,929

[22] Filed: Aug. 27, 1997

Related U.S. Application Data

[63] Continuation of application No. 08/434,048, May 3, 1995, abandoned.

[30] Foreign Application Priority Data

May 11, 1994 [JP] Japan .................................... 6-121911

[51] Int. Cl.$^6$ ...................................................... G06K 9/36
[52] U.S. Cl. ............................................ 382/242; 382/197
[58] Field of Search .................................. 382/241, 242, 382/197, 198, 258, 316, 246

[56] References Cited

U.S. PATENT DOCUMENTS

| | | | |
|---|---|---|---|
| 3,609,685 | 9/1971 | Deutsch et al. ......................... | 382/198 |
| 5,182,777 | 1/1993 | Nakayama et al. ..................... | 382/197 |
| 5,304,988 | 4/1994 | Seto ....................................... | 382/242 |
| 5,386,508 | 1/1995 | Itonori et al. .......................... | 382/197 |
| 5,448,692 | 9/1995 | Ohta ....................................... | 382/197 |
| 5,532,752 | 7/1996 | Miyano .................................. | 348/468 |

OTHER PUBLICATIONS

Jae Lim, Two–Dimensional Signal and Image Processing, 1990 pp. 613–616.
T. Pavlidis 'Algorithims for Graphics and Image Processing', 1982, Computer Science Press, Rockville Maryland 20850, p. 6, last line, paragraph 1, paragraph 3.
R. Gonzalez, P. Wintz 'Digital Image Processing', 1987, Addison–Wesley, Reading Massachusetts, p. 392, left column, paragraph 2, p. 394, left column, paragraph 2, p. 394, left column, paragraph 4.
Computing Surveys, Mar. 1974, USA, vol. 6, No. 1, ISSN 0360–0300, pp. 57–97, Freeman H. 'Computer processing of line–drawing images', p. 72, left column, paragraph 2; figure 18, p. 79, right column, paragraph 5, p. 80, left column, paragraph 2.

Patent Abstracts of Japan, vol. 012 No. 127 (E–602), Apr. 20, 1988 & JP–A–62–252229 (Mitsubishi Electric Corp) Nov. 4, 1987, abstract.

Patent Abstracts of Japan, vol. 010 No. 032 (e–379). Feb. 7, 1986 & JP–A–60 189350 (Mitsubishi Denki KK), Sep. 26, 1985, abstract.

Primary Examiner—Yon J. Couso
Attorney, Agent, or Firm—Frommer Lawrence & Haug LLP; William S. Frommer

[57] ABSTRACT

In an image signal coding and decoding method in which feature points in an image signal are detected and information concerned with sets of continuous feature points is chain-coded, the quantity of information is reduced without deterioration of image quality. An image signal coding and decoding method in which components of a direction displacement between the direction of transition from a feature point two feature points before a current feature point to a preceding feature point and the direction of transition from the preceding feature point to the current feature point are detected and subjected to entropy coding. By this method, coding can be performed which uses stochastic correlation between the direction of transition from the feature point two feature points before the current feature point to the preceding feature point and the direction of transition from the preceding feature point to the current feature, so that the number of direction codes expressing the positions of respective feature points can be reduced, and therefore the quantity of information can be reduced.

19 Claims, 15 Drawing Sheets

| DIRECTION CODE FROM FEATURE POINT 2 POINTS BEFORE TO PRECEDING FEATURE POINT | DIRECTION CODE FROM PRECEDING FEATURE POINT TO CURRENT FEATURE POINT | DIRECTION DISPLACEMENT COMPONENT CODE | KIND OF DIRECTION DISPLACEMENT |
|---|---|---|---|
| C0<br>C1<br>C2<br>C3<br>C4<br>C5<br>C6<br>C7 | C0<br>C1<br>C2<br>C3<br>C4<br>C5<br>C6<br>C7 | D0 | NO DISPLACEMENT |
| C0<br>C1<br>C2<br>C3<br>C4<br>C5<br>C6<br>C7 | C1<br>C2<br>C4<br>C0<br>C7<br>C3<br>C5<br>C6 | D1 | 45° RIGHT |
| C0<br>C1<br>C2<br>C3<br>C4<br>C5<br>C6<br>C7 | C2<br>C4<br>C7<br>C1<br>C6<br>C0<br>C3<br>C5 | D2 | 90° RIGHT |
| C0<br>C1<br>C2<br>C3<br>C4<br>C5<br>C6<br>C7 | C4<br>C7<br>C6<br>C2<br>C5<br>C1<br>C0<br>C3 | D3 | 135° RIGHT |

FIG. 8

| DIRECTION CODE FROM FEATURE POINT 2 POINTS BEFORE TO PRECEDING FEATURE POINT | DIRECTION CODE FROM PRECEDING FEATURE POINT TO CURRENT FEATURE POINT | DIRECTION DISPLACEMENT COMPONENT CODE | KIND OF DIRECTION DISPLACEMENT |
|---|---|---|---|
| C0<br>C1<br>C2<br>C3<br>C4<br>C5<br>C6<br>C7 | C3<br>C0<br>C1<br>C5<br>C2<br>C6<br>C7<br>C4 | D4 | 45° LEFT |
| C0<br>C1<br>C2<br>C3<br>C4<br>C5<br>C6<br>C7 | C5<br>C3<br>C0<br>C6<br>C1<br>C7<br>C4<br>C2 | D5 | 90° LEFT |
| C0<br>C1<br>C2<br>C3<br>C4<br>C5<br>C6<br>C7 | C6<br>C5<br>C3<br>C7<br>C0<br>C4<br>C2<br>C1 | D6 | 135° LEFT |
| C0<br>C1<br>C2<br>C3<br>C4<br>C5<br>C6<br>C7 | C7<br>C6<br>C5<br>C4<br>C3<br>C2<br>C1<br>C0 | NO CODE | PROHIBITED DIRECTION |

FIG. 9

| KIND OF DIRECTION DISPLACEMENT | DIRECTION DISPLACEMENT COMPONENT CODE | CODE WORD |
|---|---|---|
| NO DISPLACEMENT | D0 | 1 |
| 45° RIGHT | D1 | 01 |
| 45° LEFT | D4 | 001 |
| 90° RIGHT | D2 | 0001 |
| 90° LEFT | D5 | 00001 |
| 135° RIGHT | D3 | 000001 |
| 135° LEFT | D6 | 0000001 |

FIG. 10

| DETECTED PATTERN | REPLACED PATTERN |
|---|---|
| $C0 + C4$ | $dummy + C1$ |
| $C0 + C6$ | $dummy + C3$ |
| $C1 + C7$ | $dummy + C4$ |
| $C1 + C5$ | $dummy + C3$ |
| $C2 + C6$ | $dummy + C4$ |
| $C2 + C3$ | $dummy + C1$ |
| $C3 + C2$ | $dummy + C0$ |
| $C3 + C7$ | $dummy + C6$ |
| $C4 + C5$ | $dummy + C6$ |
| $C4 + C0$ | $dummy + C1$ |
| $C5 + C1$ | $dummy + C3$ |
| $C5 + C4$ | $dummy + C6$ |
| $C6 + C0$ | $dummy + C3$ |
| $C6 + C2$ | $dummy + C4$ |
| $C7 + C3$ | $dummy + C6$ |
| $C7 + C1$ | $dummy + C4$ |

FIG. 15

| DIRECTION CODE OF PRECEDING FEATURE POINT | PROHIBITED DIRECTION CODE OF CURRENT FEATURE POINT |
|---|---|
| C 0 | C 7 |
| C 1 | C 6 |
| C 2 | C 5 |
| C 3 | C 4 |
| C 4 | C 3 |
| C 5 | C 2 |
| C 6 | C 1 |
| C 7 | C 0 |

| X-COORDINATE | Y-COORDINATE | NUMBER OF FEATURE POINTS | DIRECTION 1 | DIRECTION 2 | DIRECTION 3 |

| QUANTIZED COEFFICIENT 0 | QUANTIZED COEFFICIENT 1 | QUANTIZED COEFFICIENT 2 | QUANTIZED COEFFICIENT 3 |

SAME VALUE   DIFFERENT VALUE   SAME VALUE   SAME VALUE

| X-COORDINATE | Y-COORDINATE | NUMBER OF FEATURE POINTS | QUANTIZED COEFFICIENT 0 | DIRECTION 1 | DIRECTION 2 |

| DIRECTION OPPOSITE TO DIRECTION 2 | QUANTIZED COEFFICIENT 2 | DIRECTION 3 | ns.
IMAGE SIGNAL CODING AND DECODING METHOD AND APPARATUS

This application is a continuation of application Ser. No. 08/434,048, filed May 3, 1995 now abandoned.

BACKGROUND OF THE INVENTION

1. Field of the Invention

This invention relates to an image signal coding and decoding method, and more particularly is applicable to the case where feature points in an image are detected to thereby encode an image signal with high efficiency.

2. Description of the Related Art

Heretofore, as a method of encoding an image signal with high efficiency, there has been used a method in which an input image is orthogonally transformed by means of DCT (Discrete Cosine Transform) to thereby perform adaptive quantization corresponding to human visual characteristic for each frequency band, or a method in which an image is divided into bands by wavelet bases to thereby perform weighting for each band before encoding of the image. According to those methods, a high compression ratio can be obtained without distortion made prominent visually.

However, if the compression ratio is made higher, those methods have a disadvantage in that visually undesirable effects such as block distortion, and so on, are revealed. For this reason, as a coding method which makes such visually undesirable effects (distortion) avoidable even under the high compression rate, there is used a structure extraction coding method using detection of feature points in an image, in which feature points in a structure of an image are extracted to thereby perform efficient coding.

For example, as shown in FIG. 1, a structure extraction encoder 1 for detecting feature points in an image and encoding an image signal makes an input image signal S1 pass through a filter 2 constituted by a smoothing filter or by a wavelet-based band split filter to thereby generate a filter coefficient signal S2 and feed it to a quantizer 3 and to a two-dimensional feature point detecting circuit 4, respectively.

The quantizer 3 quantizes the filter coefficient signal S2 to thereby generate a quantized coefficient signal S3 and feed it to a select multiplexing circuit 5. The two-dimensional feature point detecting circuit 4 detects a feature point on the basis of the filter coefficient signal S2 and feeds a flag as a select signal S4 to the select multiplexing circuit 5 so that the flag has a value "1" when the current signal is detected as the feature point whereas the flag has a value "0" when the current signal is not detected as the feature point.

The select multiplexing circuit 5 multiplexes the quantized coefficient signal S3 at the feature point in the case of the select signal S4 of "1" and the chain-coded coordinates of the feature points and feeds the resulting multiplexed signal as a feature point signal S5 to a variable-length coding circuit 6. The variable-length coding circuit 6 applies entropy coding to the feature point signal S5 and feeds the thus obtained variable-length coded feature point signal S6 to a buffer memory 7. The buffer memory 7 smoothes the quantity of information of the variable-length coded feature point signal S6 and outputs the resulting signal as an output signal S7.

Here, the select multiplexing circuit 5 is configured as shown in FIG. 2. That is, the select multiplexing circuit 5 temporarily stores the select signal S4 in a frame buffer 8 and temporarily stores the quantized coefficient signal S3 in a frame buffer 9.

A chain coding circuit 10 extracts all sets of continuous feature points as chains from one scene by reference to the contents of the frame buffer 8 and outputs information with respect to each chain. For each chain, the coordinates of a starting point of the chain and the number of feature points contained in the chain are expressed at the starting point, and at each of feature points following the starting point are expressed at the feature point, a direction from a preceding feature point to a current feature point is outputted in accordance with codes as shown in FIG. 3 for expressing the coordinates thereof.

A chain code output signal S8 and a corresponding feature point quantized coefficient signal S10 taken out from the frame buffer 9 on the basis of an addressing signal S9 are multiplexed by a multiplexing circuit 11, so that the resulting multiplexed signal is outputted as a feature point signal S5.

That is, the multiplexing circuit 11 receives the chain code output signal S8 expressing the coordinates of a starting point of the chain, the number of feature points contained in the chain and the respective directions of transition of feature points following the starting point of the chain as shown in FIG. 4A and the feature point quantized coefficient signal S10 expressing the quantized coefficients at the respective feature points as shown in FIG. 4B, and multiplexes these signals S8 and S10 to thereby output a feature point signal S5 as shown in FIG. 4C.

The image data encoded by the structure extraction encoder 1 are decoded by a structure extraction decoder 12 as shown in FIG. 5. That is, the structure extraction decoder 12 makes a buffer 13 smooth the quantity of information of the image data signal S7 outputted from the structure extraction encoder 1 and then makes a variable-length decoding circuit 14 perform variable-length decoding to thereby obtain a feature point signal S11, which is fed to a split output circuit 15.

The split output circuit 15 divides the feature point signal S11 into positional information and quantized coefficient information and arranges quantized coefficients in the order of line scanning to thereby feed the quantized coefficients as a signal S12 to an inverse quantizer 16 which follows the split output circuit 15. The inverse quantizer 16 inverse-quantizes the quantized coefficient signal S12 to thereby generate a reconstructed coefficient signal S13 and feed it to an inverse transformation circuit 17. The inverse transformation circuit 17 outputs the reconstructed coefficient signal S13 without any change or applies transformation such as inverse wavelet transformation, or the like, to the reconstructed coefficient signal S13 and then supplies the resulting signal as an output signal S14, for example, to a television monitor, or the like.

Here, the conventional split output circuit 15 is configured as shown in FIG. 6. That is, the split output circuit 15 makes a splitting circuit 18 split the feature point signal S11 to thereby obtain a chain-coded positional information signal S15 and a quantized coefficient signal S16 and feed the two kinds of signals S15 and S16 to a chain decoding circuit 19 and a frame buffer 20, respectively. The chain decoding circuit 19 decodes the chain-coded positional information signal S15 so that the coded coordinates of the starting point of the chain is decoded at the starting point and that the direction of transition from a preceding feature point to a current feature point is decoded at each of feature points following the starting point in accordance with the coding as shown in FIG. 3. The chain decoding circuit 19 calculates the coordinates of the respective feature points on the basis of the decoded directions successively and supplies a feature point addressing signal S17 to the frame buffer 20 on the basis of results of the calculation. The frame buffer 20 stores the quantized coefficient signal S16 in addresses assigned by the addressing signal S17 successively and then outputs the quantized coefficient signal S16 as a split output circuit output S12 in the order of line scanning after processing for one scene is completed.

The aforementioned conventional feature point coding method is designed so that directions of transition which express the positions of feature points are encoded independent of each other only in accordance with the direction of transition from a preceding feature point to a current feature point. As a result, direction codes become redundant when there is some stochastic correlation between the direction of transition from a feature point two feature points before a current feature point to a preceding feature point and the direction of transition from the preceding feature point to the current feature point. There arises a disadvantage in that the codes increase in quantity.

Further, some specific pattern of direction codes of feature points can be replaced by another shorter pattern of direction codes without any visual difference between an image signal decoded from feature points and the original image signal. For example, the patterns which change sharply at pixel level can be hardly perceived actually. Moreover, most of patterns which change sharply at pixel level are caused by noise and should not be encoded normally. In the conventional feature point coding method, however, direction codes expressing the positions of feature points are obtained by equally coding all feature points. As a result, there arises a disadvantage in that direction codes become so redundant as to be increased in quantity correspondingly.

Further, in the conventional feature point coding method, quantized coefficients of feature points must be encoded correspondingly to the feature points. Accordingly, even in the case where quantized coefficients of feature points take the same value continuously, the same coefficient information must be fed repeatedly for the feature points. There arises a disadvantage in that the codes of the feature points contain a large amount of redundant components so as to increase the codes in quantity.

SUMMARY OF THE INVENTION

In view of the foregoing, an object of this invention is to provide an image signal coding and decoding method in which the quantity of codes can be reduced without deterioration of image quality when feature points in an image signal are detected so that information of continuous feature points is chain-coded.

The foregoing object and other objects of the invention have been achieved by the provision of an image signal coding method in which feature points are detected from an input image signal, the position of a current feature point is expressed by using the direction of transition from a preceding feature point to the current feature point, and information concerned with sets of continuous feature points is subjected to chain coding, characterized in that components of a direction displacement between the direction of transition from a feature point two feature points before the current feature point to the preceding feature point and the direction of transition from the preceding feature point to the current feature point are detected and subjected to entropy coding.

Further, according to this invention, in an image signal coding method in which feature points are detected from an input image signal, the position of a current feature point is expressed by using the direction of transition from a preceding feature point to the current feature point, and information concerned with sets of continuous feature points is subjected to chain coding, a specific pattern is detected from patterns each composed of a plurality of continuous directions and the specific pattern is replaced by another pattern composed of a smaller number of directions.

Further, according to this invention, the specific pattern is designed so as to be a pattern in which there is an acute change between directions continuous to each other.

Further, according to this invention, in an image signal coding method in which information concerned with sets of continuous feature points is chain-coded by detecting feature points from an input image signal and multiplexing amplitude values at the feature points upon encoded positional information, only the positional information is encoded without encoding the amplitude value at the current feature point when there is no change between the amplitude value at the current feature point and the amplitude value at a preceding feature point, and the positional information and the amplitude value at the current feature point are multiplexed and encoded when there is some change between the amplitude value at the current feature point and the amplitude value at the preceding feature point.

Further, according to this invention, in the image signal coding method not only the positional information and the amplitude value at the current feature point but also components of the direction of transition from the current feature point to the preceding feature point are multiplexed and encoded when there is some change between the amplitude value at the current feature point and the amplitude value at the preceding feature point.

Further, according to this invention, in an image signal decoding method, the method for decoding a coded data which is obtained by sequentially detecting the direction C0 to C7 from a preceding feature point to the current feature point, detecting component of a direction displacement D0 to D6 between the preceding feature point and the current feature point for the direction from two feature points before the current feature point to the preceding feature point, and entropy coding the component of a direction displacement D0 to D6: the component of a direction displacement D0 to D6 are entropy decoded from the coded data; and the position of each feature point is obtained based on the decoded component of a direction displacement.

Furthermore, according to this invention, in an image signal decoding method, the method for decoding the coded data which is obtained by coding only the component of direction C0 to C7 from the preceding feature point to the current feature point without encoding the amplitude value at the current feature point when there is no change between the amplitude value at the current feature point and the amplitude value at a preceding feature point, and multiplexing and coding the component of direction C0 to C7 from the preceding feature point to the current feature point, the component of direction C7 to C0 from the current feature point to the preceding feature point, and the amplitude value at the current feature point when there is some change between the amplitude value at the current feature point and the amplitude value at the preceding feature point, comprising the steps of: detecting whether or not the component of direction C7 to C0 from said current feature point to the preceding feature point is included in the coded data; decoding the current feature point by using the amplitude value of the preceding feature point, when there is no component of direction C7 to C0 from the current feature point to the preceding feature point; and decoding the current feature point by using the amplitude value of the current feature point, when there is some component of direction C7 to C0 from the current feature point to the preceding feature point.

The detecting components of a direction displacement between the direction of transition from a feature point two feature points before a current feature point to a preceding feature point and the direction of transition from the preceding feature point to the current feature point are detected, and the direction displacement components are subjected to entropy coding, so that stochastic offset is produced between the direction displacement components correspondingly to the input image signal. As a result, it is possible to perform coding using stochastic correlation between the direction of transition from the feature point two feature points before the current feature point to the preceding feature point and the direction of transition from the preceding feature point to the current feature point, so that the number of bits required for encoding directions expressing the positions of respective feature points is reduced and, therefore, the quantity of information can be reduced.

Further, a specific pattern is detected from patterns each of which is composed of a plurality of continuous directions and the specific pattern is replaced by another pattern composed of a smaller number of directions, so that the number of direction codes expressing the positions of feature points can be reduced and, therefore, the quantity of information can be reduced without changing the quality of the reconstructed image.

In addition, only the positional information is encoded without encoding the amplitude value at the current feature point when there is no change between the amplitude value at the current feature point and the amplitude value at a preceding feature point, while the positional information and the amplitude value are multiplexed at the current feature point when there is some change between the amplitude value at the current feature point and the amplitude value at the preceding feature point. Accordingly, the necessity of encoding the amplitude values at feature points is eliminated when there is no change between the amplitude values at the feature points, so that efficiency in encoding feature points can be improved and, therefore, the quantity of information can be reduced.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 8 is a table explaining code assignment of direction displacement components;

FIG. 9 is a table explaining code assignment of direction displacement components;

FIG. 10 is a table explaining assignment of code words for respective direction displacement component codes;

FIG. 15 is a table explaining the operation of the pattern detection and replacement circuit;

FIG. 17 is a table showing an example of prohibited codes according to the third embodiment;

FIGS. 19A to 19C are schematic diagrams explaining the operation of the third embodiment.

DETAILED DESCRIPTION OF THE EMBODIMENT

Preferred embodiments of this invention will be described with reference to the accompanying drawings:

(1) First Embodiment

Figure 1:
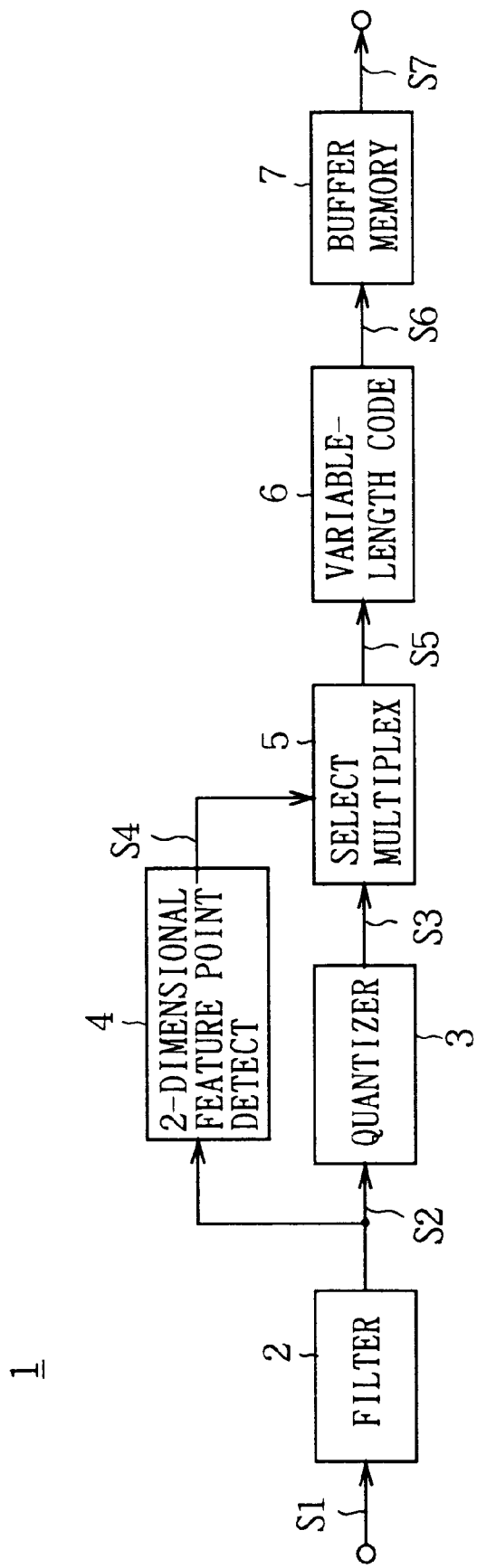
FIG. 1 is a block diagram showing the configuration of a structure extraction encoder.
Figure 7:
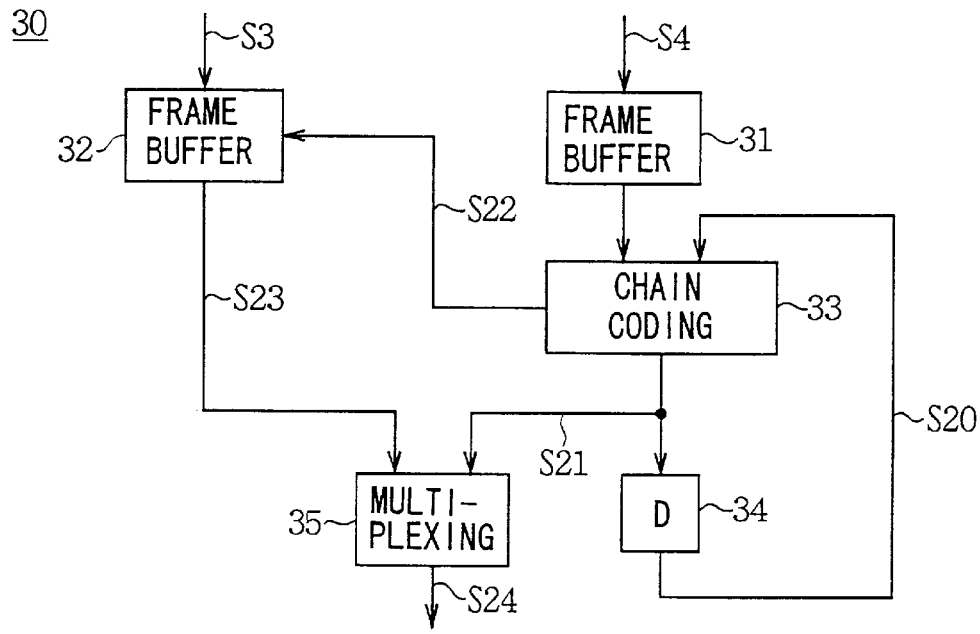
FIG. 7 is a block diagram showing the configuration of a select multiplexing circuit according to a first embodiment of this invention.

In FIG. 7, the reference numeral 30 designates as a whole a select multiplexing circuit which is equivalent to the select multiplexing circuit 5 in FIG. 1.

The select multiplexing circuit 30 temporarily stores in a frame buffer 31 a select signal S4 received from a two-dimensional feature point detecting circuit 4 (FIG. 1) and temporarily stores in a frame buffer 32 a quantized coefficient signal S3 received from a quantizer 3 (FIG. 1).

Figures 2, 3:
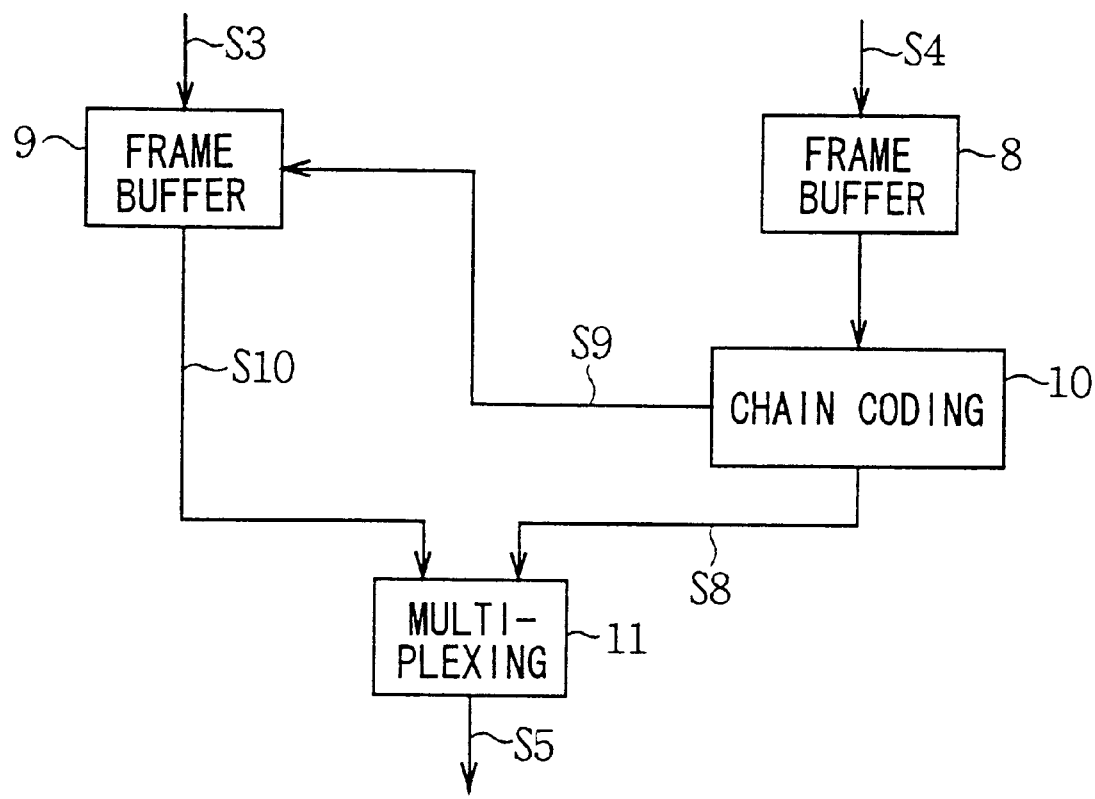
FIG. 2 is a block diagram showing the configuration of a conventional select multiplexing circuit.
FIG. 3 is a table showing direction codes.
Figure 4:
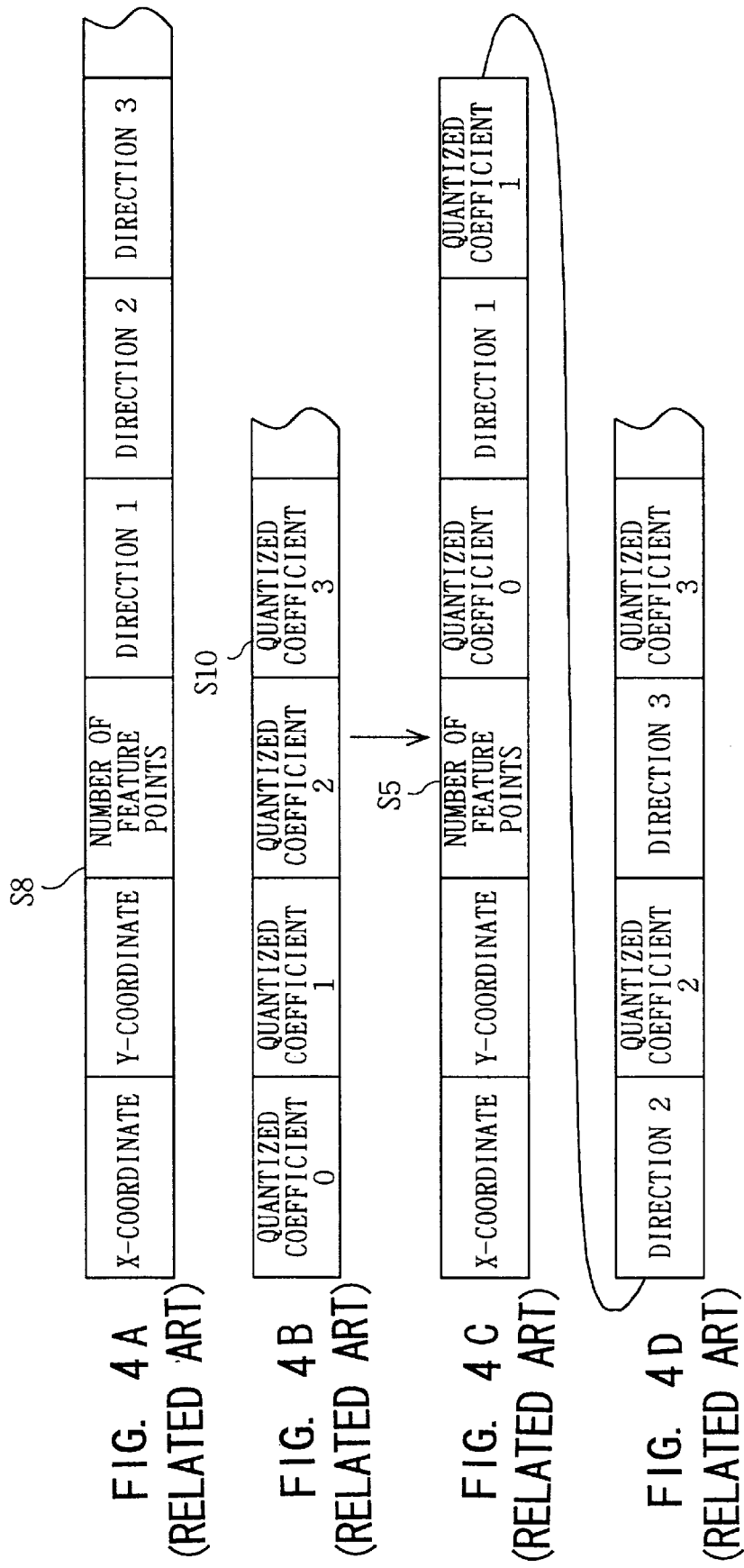
FIGS. 4A to 4D are schematic diagrams explaining the operation of the conventional multiplexing circuit.

A chain coding circuit 33 extracts all sets of continuous feature points as chains from one scene by reference to the contents of the frame buffer 31 and outputs information as for the direction from the preceding feature point to the current feature point with respect to each chain in accordance with coding as shown in FIG. 3 so that the coordinates of a starting point of the chain and the number of feature points contained in the chain are expressed at the starting point of the chain and the coordinates of a feature point following the starting point are expressed at the feature point one feature point before the starting point.

Further, with respect to subsequent feature points, the chain coding circuit 33 compares the direction of transition from a preceding feature point to a current feature point with the direction of transition S20 from a feature point two feature points before the current point to the preceding feature point by feeding back the direction of transition from the preceding feature point to the current feature point through a delay element 34 and outputs the direction displacement of transition from the preceding feature point to the current feature point in accordance with coding as shown in FIGS. 8 and 9.

That is, the chain coding circuit 33 provides a chain code output S21 so that a direction displacement code D0 is outputted when, for example, the direction of transition from the preceding feature point to the current feature point is equal to the direction of transition from the feature point two feature points before the current point to the preceding feature point and that a direction displacement code D1 is outputted when, for example, the direction of transition changes to the right (clockwise) by 45[°].

The chain code output S21 and a corresponding feature point quantized coefficient signal S23 taken out from the frame buffer 32 on the basis of an addressing signal S22 are multiplexed by a multiplexing circuit 35, so that the multiplexed signal is outputted as a feature point signal S24.

FIG. 10 shows an example of assignment of direction displacement codes D0 to D6 to words coded by a Hoffman coding method. In this embodiment, as shown in FIG. 10, direction displacement codes D0 to D6 are replaced by coded words "1" to "0000001" so that a direction displacement code D0 expressing "no change" is assigned to the coded word smallest in the number of bits and that a direction displacement code expressing "a certain change" is assigned to a coded word having a bit length corresponding to the change.

As for an image signal, the probability of smaller direction displacement in the transition of a feature point generally has a tendency to be higher than the probability of larger direction displacement in the transition of a feature point. For example, in the case of a general image, the probability that feature points will be connected nearly straight is higher than the probability that feature points will be connected while frequently changing the direction of transition thereof. Taking this fact into account, in this embodiment, a variable-length coding circuit 6 (FIG. 1) following the select multiplexing circuit 30 in FIG. 1 (5 in FIG. 14) is provided so that a direction displacement code relatively high in the probability of occurrence, such as D0, D1 or D4, is assigned to a coded word having a relatively small number of bits whereas a direction displacement code relatively low in the probability of occurrence, such as D3 or D6, is assigned a coded word having a relatively large number of bits, that is, the quantity of information can be reduced by applying so-called entropy coding thereto.

Figure 5:
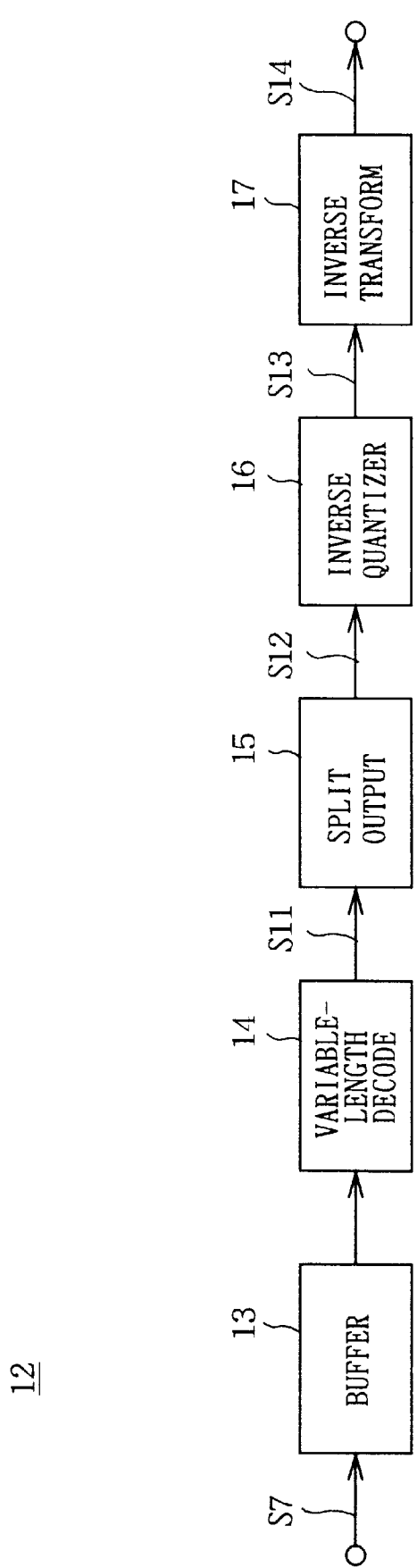
FIG. 5 is a block diagram showing the configuration of a structure extraction decoder.
Figure 6:
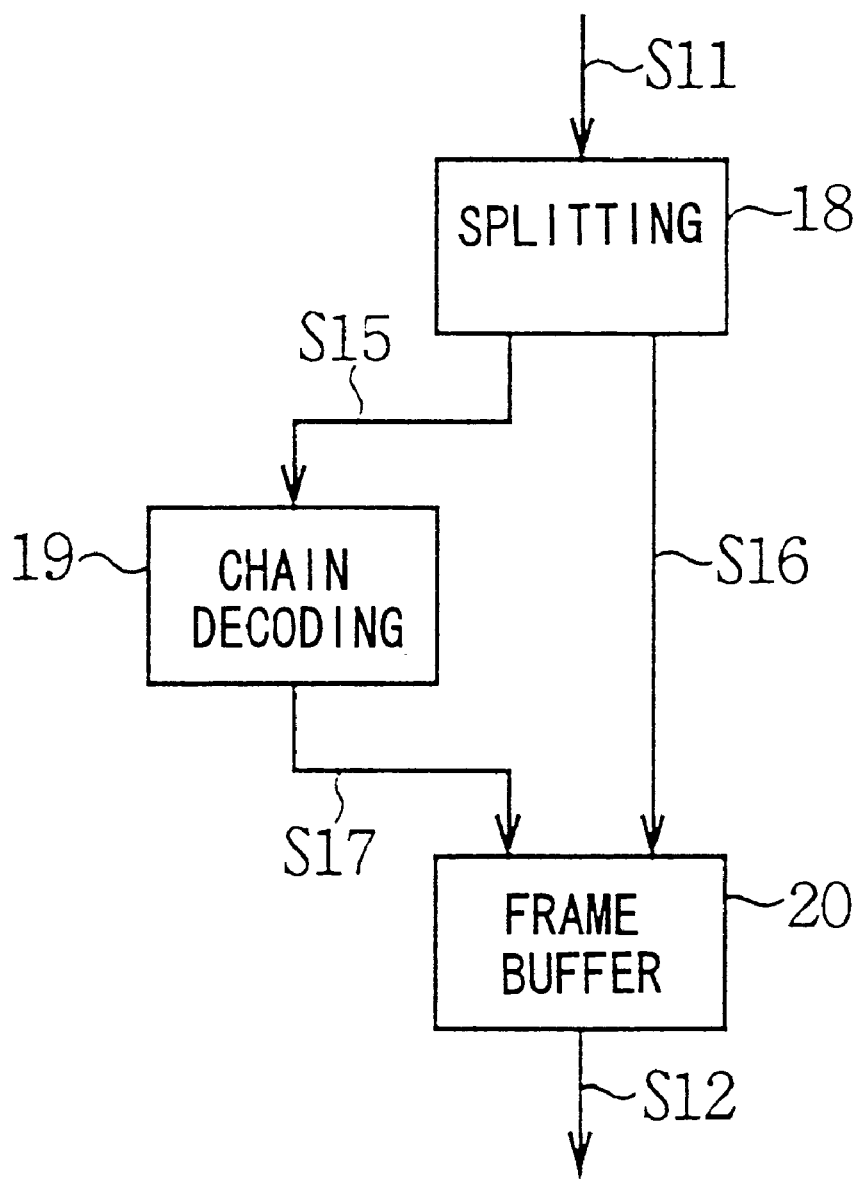
FIG. 6 is a block diagram showing the configuration of a conventional split output circuit.
Figure 11:
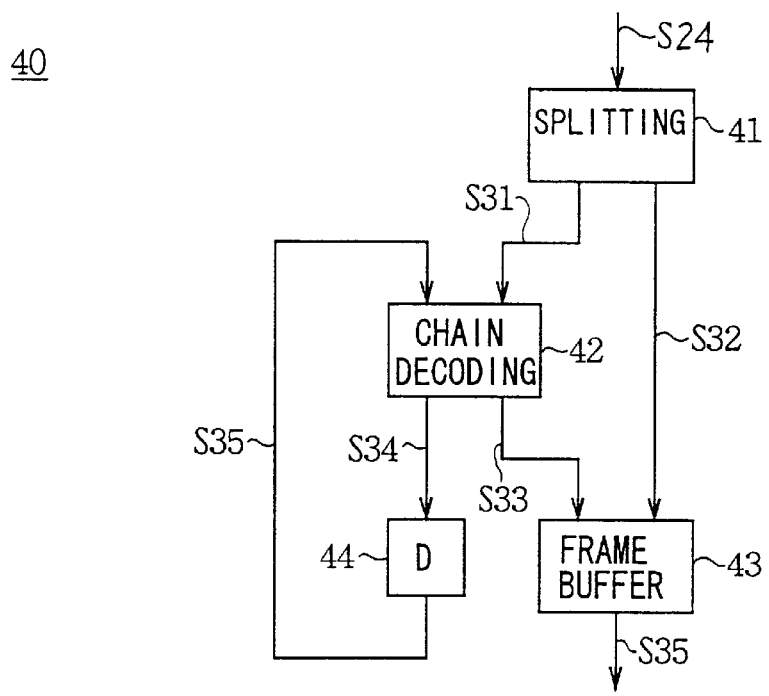
FIG. 11 is a block diagram showing the configuration of a split output circuit according to the first embodiment.

Here, image data chain-coded by a structure extraction encoder (see FIG. 1) having the select multiplexing circuit 30 can be decoded by a structure extraction decoder (see FIG. 2) having a split output circuit 40 as shown in FIG. 11. The split output circuit 40 corresponds to a split output circuit 15 in FIG. 5.

The split output circuit 40 makes a splitting circuit 41 split the feature point signal S24 to thereby obtain a chain-coded positional information signal S31 and a quantized coefficient signal S32 and feed the two kinds of information signals S31 and S32 to a chain decoding circuit 42 and a frame buffer 43, respectively.

The chain decoding circuit 42 decodes the chain-coded positional information signal S31. That is, at a starting point of a chain, the coded coordinates of the starting point are decoded and, at a feature point following the starting point, the direction of transition from the starting point to the feature point is decoded in accordance with the coding shown in FIG. 3. Further, with respect to subsequent feature points, the respective coordinates of the feature points are calculated successively on the basis of direction codes C0 to C7 which are obtained successively in accordance with the coding rule shown in FIGS. 8 and 9 on the basis of direction displacement component codes D0 to D6 given as the positional information signal S31, so that results of the calculation are supplied as a feature point addressing signal S33 to the frame buffer 43.

Practically, the chain decoding circuit 42 is designed so that direction codes C0 to C7 are obtained successively in the time sequence of from a former feature point to a latter feature point by feeding back a decoded direction signal S34 through a delay element 44. That is, the chain decoding circuit 42 is designed so as to output a null code "0" as the direction signal S34 at the starting point of a chain, and output, as the direction signal S34, one of direction codes C0 to C7 expressing the direction of transition from the starting point to the current feature point as shown in FIG. 3 at a feature point following the starting point. Further, at each feature point after that, a direction displacement code (one of direction displacement codes D0 to D6) between a direction code (one of direction codes C0 to C7) expressing the direction of transition from a feature point two feature points before the current feature point to a preceding feature point and a direction code (one of direction codes C0 to C7) expressing the direction of transition from the preceding feature point to the current feature point is decoded in accordance with coding shown in FIGS. 8 and 9 and, then, the direction code (one of direction codes C0 to C7) expressing the direction of transition from the preceding feature point to the current feature point as shown in FIG. 3 is decoded on the basis of the direction displacement code (one of direction displacement codes D0 to D6) and the direction signal S35 expressing the direction of transition from the feature point two feature points before the current point to the preceding feature point. Subsequently, the chain decoding circuit 42 calculates the coordinates of the current feature point on the basis of the decoded direction (one of direction codes C0 to C7) and supplies results of the calculation as a feature point addressing signal S33 to the frame buffer 43.

The frame buffer 43 stores the quantized coefficient signal S32 in addresses assigned by the addressing signal S33 successively and then outputs the quantized coefficient signal S32 as a split output circuit output S35 in the order of line scanning after processing for one scene is completed.

In the aforementioned configuration, the chain coding circuit 33 of the select multiplexing circuit 30 generates a chain code output signal S21 expressing the direction (one of direction codes C0 to C7) of transition from the preceding feature point to the current feature point on the basis of the select signal S4 received from the two-dimensional feature point detecting circuit 4 (FIG. 1) and supplies the chain code output signal S21 to the multiplexing circuit 35.

At the same time, the chain coding circuit 33 generates a direction displacement component code (one of codes D0 to D6) corresponding to the degree of displacement between the direction (one of codes C0 to C7) of transition from the feature point two feature points before the current feature point to the preceding feature point and the direction (one of codes C0 to C7) of transition from the preceding feature point to the current feature point, by comparing the two directions with each other and outputs the direction displacement component code (one of codes D0 to D6) as a chain code output S21.

Here, stochastic offset is produced between the direction displacement component codes D0 to D6 correspondingly to the type of the image. Therefore, the variable-length encoding circuit 6 (FIG. 1) following the select multiplexing circuit 30 applies so-called entropy coding so that, of the direction displacement component codes D0 to D6, a direction displacement component code relatively high in the probability of generation is assigned a code composed of a relatively small number of bits whereas a direction displacement component code relatively low in the probability of generation is assigned a code composed of a relatively large number of bits. As a result, the quantity of information can be reduced totally compared with the case where direction displacement component codes equal in the probability of generation are assigned codes each composed of an equal number of bits.

In the aforementioned configuration, a direction displacement component code (one of codes D0 to D6) corresponding to the degree of direction displacement between the direction (one of direction codes C0 to C7) of transition from a feature point two feature points before a current feature point to a preceding feature point and the direction (one of direction codes C0 to C7) of transition from the preceding feature point to the current feature point is generated by comparing the two direction codes with each other and, then, entropy coding is applied to the direction displacement component code (one of codes D0 to D6), so that the number of bits required for encoding direction codes can be reduced when an image signal is chain-coded and transmitted.

(2) Second Embodiment

Figure 12:
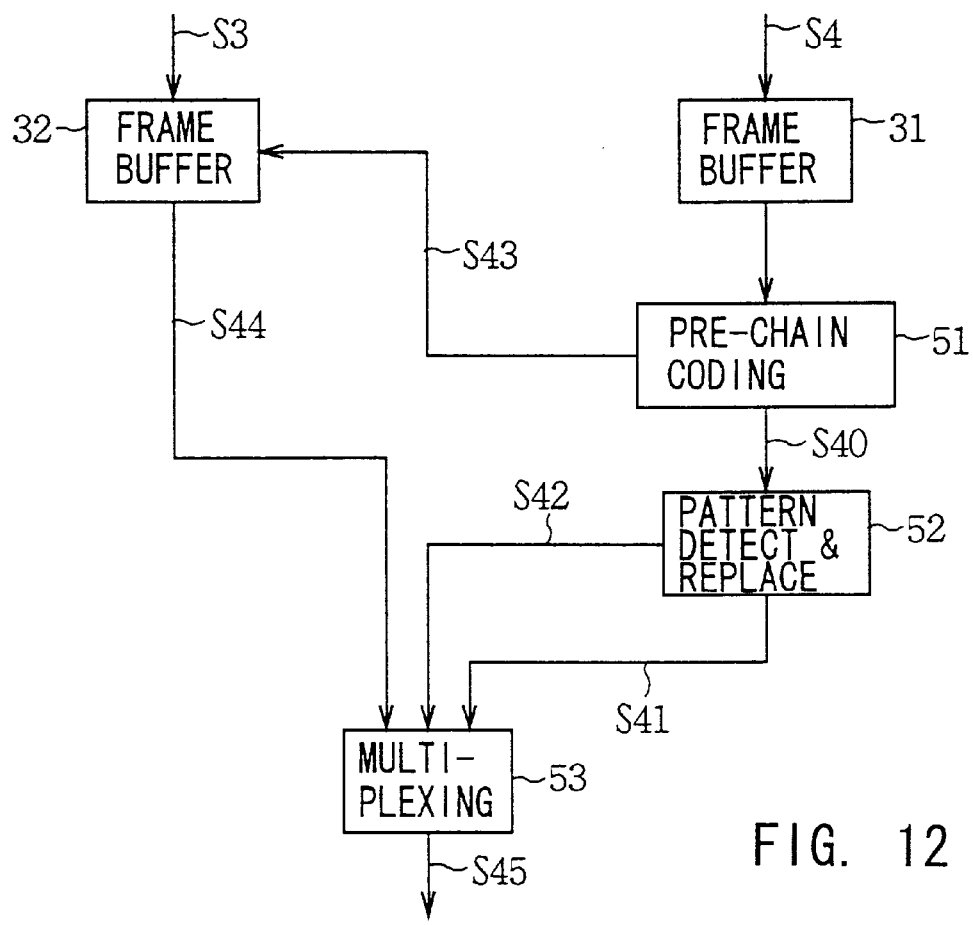
FIG. 12 is a block diagram showing the configuration of a select multiplexing circuit according to a second embodiment of this invention.

Like numerals in each of FIGS. 7 and 12 refer to like parts. In FIG. 12, the reference numeral 50 designates, in general, a select multiplexing circuit as a second embodiment of this invention, which is designed so that the number of bits constituting a direction code is reduced by replacing a specific continuous pattern by another pattern when the specific continuous pattern exists in the direction (one of codes C0 to C7) of transition from the preceding feature point to the current feature point.

Figure 13:
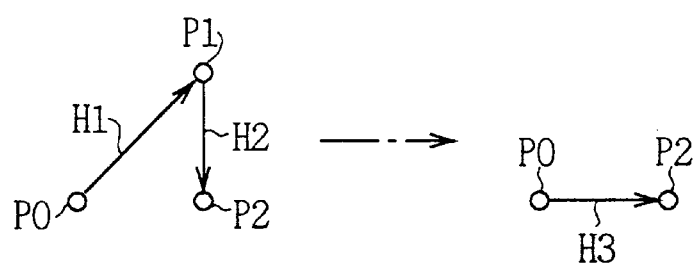
FIGS. 13A and 13B are schematic diagrams explaining replacement of one direction code pattern by another pattern.
Figure 13:
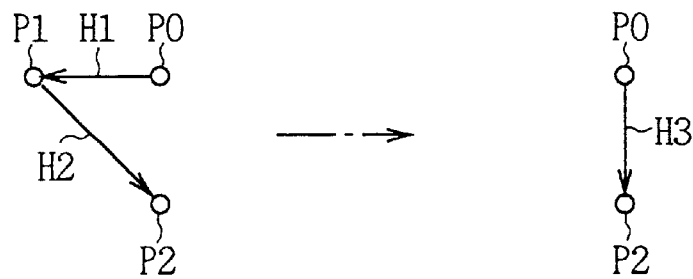

In this embodiment, the select multiplexing circuit 50 is designed so that a direction H1 of transition from a feature point P0 two feature points before a current feature point P2 to a preceding feature point P1 and a direction H2 of transition from the preceding feature point P1 to the current feature point P2 are replaced by a direction H3 of transition from the feature point P0 two feature points before the current feature point P2 to the preceding feature point P1 when there is an acute change between the directions H1 and H2 as shown in FIG. 13.

That is, when there is an acute change between direction codes before and after an intermediate feature point P1 as shown in FIG. 13, the number of bits for direction codes is reduced by neglecting the feature point P1 and regarding only one direction H3 as a subject of coding because a reconstructed image which differs little from the original image visually can be obtained in spite of deletion of the feature point P1.

Practically, the select multiplexing circuit 50 includes a pre-chain coding circuit 51 which operates in the same manner as the conventional chain coding circuit 10 (FIG. 2). That is, the pre-chain coding circuit 51 extracts all sets of continuous feature points as chains from one scene by reference to the contents of the frame buffer 31 and outputs, with respect to each chain, the direction of transition from a preceding feature point to a current feature point in accordance with coding as shown in FIG. 3 so that the coordinates of a starting point of the chain and the number of feature points contained in the chain are expressed at the starting point and that the coordinates of feature points following the starting point are expressed at the feature points, respectively.

A pattern detection and replacement circuit 52 detects specific patterns (in this embodiment, patterns having acutely changing directions) with respect to all direction codes of a pre-chain code output signal S40 and replaces the detected specific patterns by other patterns, so that the resulting signal is outputted as a chain code output S41 after the number of feature points contained in the chain as given at the starting point of the chain is replaced by a new number of feature points reduced by the replacement of the patterns.

Further, the pattern detection and replacement circuit 52 feeds to a multiplexing circuit 53 a dummy indication signal S42 which rises up at the positions of dummy data in order to indicate the position of dummy data inserted into direction codes by the replacement of patterns of direction codes but falls down at other positions.

The multiplexing circuit 53 multiplexes the chain code output signal S41 and a feature point quantized coefficient signal S44 taken out from a frame buffer 32 on the basis of an addressing signal S43 only in the case where the dummy indication signal S42 has fallen down. The resulting multiplexed signal is outputted as a feature point signal S45.

Figures 14A, 14B, 14C:
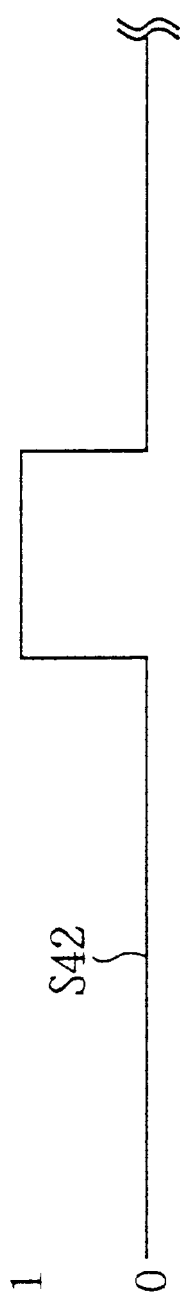
FIGS. 14A to 14C are schematic diagrams explaining the operation of the pattern detection and replacement circuit.

In the aforementioned configuration, upon reception of the pre-chain code output signal S40 as shown in FIG. 14A, the pattern detection and replacement circuit 52 of the select multiplexing circuit 50 detects patterns having acutely changing directions in the pre-chain code output signal S40 and replaces the patterns by shorter patterns having a smaller quantity of information.

For example, if there is an acute change between the direction 1 and the direction 2 in FIG. 14A, a new direction is applied to the rear of the dummy data as shown in FIG. 14B. Further, because in this case the two directions 1 and 2 are replaced by a new direction, the number of feature points in the pre-chain code output signal S40 is reduced correspondingly to the number of patterns reduced by the replacement and the resulting signal is outputted as a chain code output signal S41. FIG. 9 shows an example of patterns detected by the pattern detection and replacement circuit 52 and patterns substituted for the detected patterns by the pattern detection and replacement circuit 52.

As a result, the number of direction codes which are subjects of coding can be reduced, so that the number of bits constituting the direction codes can be reduced.

In the aforementioned configuration, when there is some acutely changing pattern in continuous direction codes C0 to C7, this pattern is replaced by a pattern composed of a smaller number of direction codes to thereby reduce the number of direction codes which are subjects of coding. As a result, codes can be reduced in quantity correspondingly to the reduction of the number of direction codes.

(3) Third Embodiment

Figure 16:
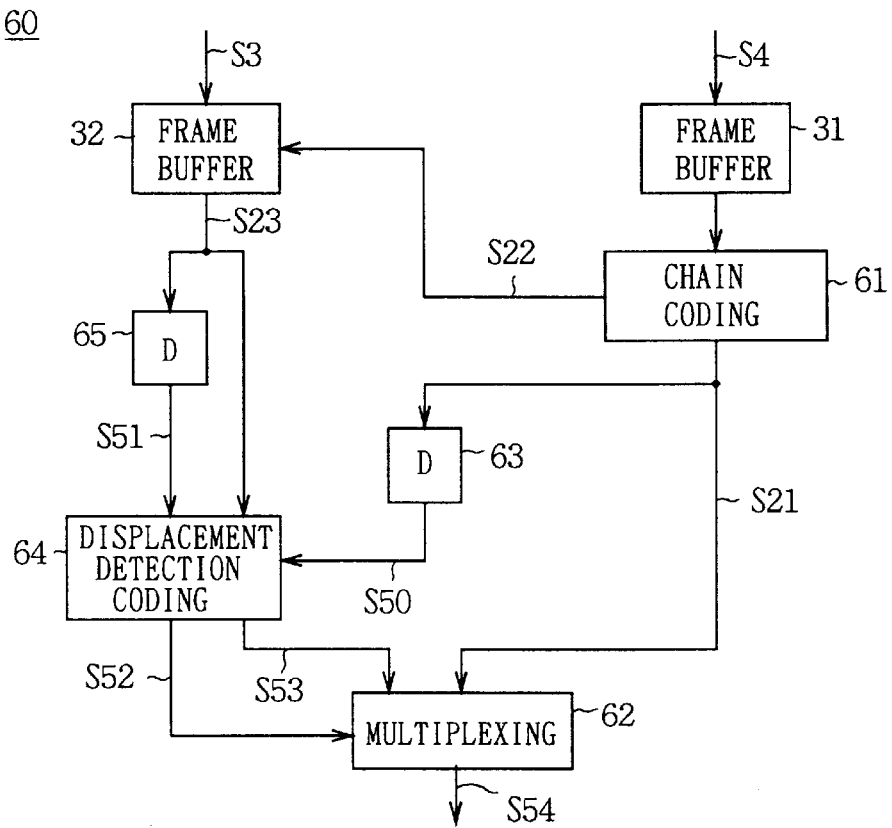
FIG. 16 is a block diagram showing the configuration of a select multiplexing circuit according to a third embodiment of this invention.

In FIG. 16, parts corresponding to those in FIG. 7 are referenced correspondingly. In FIG. 16, the reference numeral 60 generally designates a select multiplexing circuit as a third embodiment of this invention. The select multiplexing circuit 60 is designed so that codes are reduced totally in quantity by removing the quantized coefficient of the current feature point from subjects of coding when the quantized coefficient S3 of the current feature point is equal to the quantized coefficient S3 of a preceding feature point.

Practically, the select multiplexing circuit 60 includes a chain coding circuit 61 which extracts all sets of continuous feature points as chains from one scene and generates, with respect to each chain, the coordinates of a starting point of the chain and the direction of transition from a preceding feature point to a current feature point in accordance with coding as shown in FIG. 16 to express the coordinates of feature points following the starting point. These codes are fed as a chain code output signal S21 to a multiplexing circuit 62.

In addition, the chain coding circuit 61 supplies, through a delay element 63, a displacement detection encoding circuit 64 with a chain code output signal S50 of one sample ago.

Further, the displacement detection encoding circuit 64 directly receives a feature point quantized coefficient signal S23 taken out from the frame buffer 32 on the basis of the addressing signal S22 and receives a preceding feature point quantized coefficient signal S51 of one sample ago through a delay element 65.

The displacement detection encoding circuit 64 feeds a flag "1" as a multiplex select signal S52 to the multiplexing circuit 62 at the starting point of the chain and feeds the feature point quantized coefficient signal S23 as a multiplex feature point quantized coefficient signal S53 to the multiplexing circuit 62.

On the other hand, after the starting point, the feature point quantized coefficient signal S23 taken out on the basis of the addressing signal S22 is compared with the feature point quantized coefficient signal S51 of one sample ago. When the values of the two signals are different from each other, a flag "1" is outputted as the multiplex select signal S52. At the same time, with respect to the multiplex feature point quantized coefficient signal S53, a prohibited direction code expressing returning from the direction code of one sample ago to the preceding feature point is calculated on the basis of the chain code output signal S50, so that the prohibited direction code and the feature point quantized coefficient signal S23 are multiplexed and outputted. The "prohibited direction code" herein used means a direction code which is such that the direction code at the current feature point is reverse to the direction code at the preceding feature point as shown in FIG. 17. Practically, in such case, the prohibited direction code is not used as a direction code for chain coding because the position of the preceding feature point becomes equal to the position of the current feature point.

Further, when the value of the feature point quantized coefficient signal S23 is equal to the value of the feature point quantized coefficient signal S51 of one sample ago, the displacement detection encoding circuit 64 outputs a flag "0" as the multiplex select signal S52 and outputs "0" as the multiplexed feature point quantized coefficient signal S53.

The multiplexing circuit 62 outputs only the chain code output signal S21 as a feature point signal S54 when the multiplex select signal S52 is "0", and the multiplexing circuit 62 multiplexes the chain code output signal S21 and the multiplex feature point quantized coefficient signal S53 and outputs the resulting multiplexed signal as a feature point signal S54 when the multiplex select signal S52 is "1".

Figure 18:
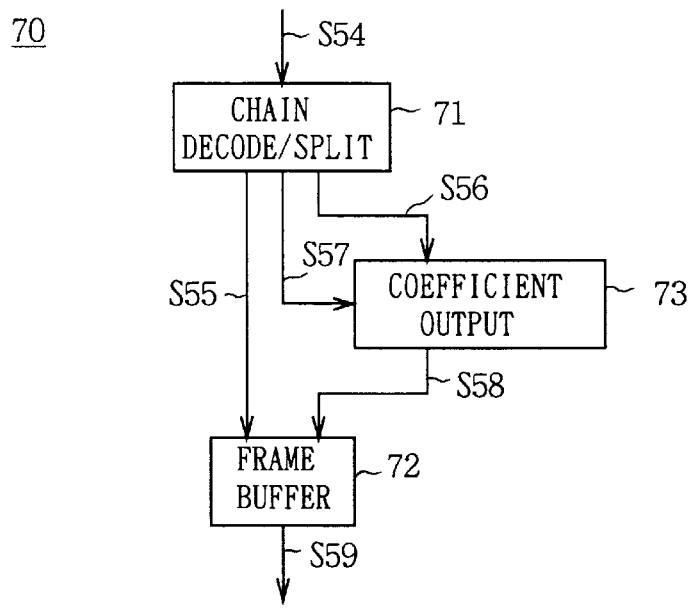
FIG. 18 is a block diagram showing the configuration of a split output circuit according to the third embodiment.

Here, image data chain-coded by a structure extraction encoder having the select multiplexing circuit 60 can be decoded by a structure extraction decoder having a split output circuit 70 as shown in FIG. 18. The split output circuit 70 corresponds to a split output circuit 15 in FIG. 5.

The split output circuit 70 includes a chain decoding and splitting circuit 71 which receives the feature point signal S54. The chain decoding and splitting circuit 71 calculates the coordinates of respective feature points successively on the basis of direction codes C0 to C7 contained in the feature point signal S54 and feeds results of the calculation as a feature point addressing signal S55 to a frame buffer 72.

When the prohibited direction code expressing returning to the coordinates of the preceding feature point is not detected in this case, the chain decoding and splitting circuit 71 supplies the calculated coordinates as an addressing signal S55 directly to the frame buffer 72. When the prohibited direction code is detected contrariwise, the chain decoding and splitting circuit 71 repeats to supply the coordinates of the preceding feature point as a current feature point addressing signal S55 to the frame buffer 72.

Further, when the starting point of the chain or the prohibited direction code expressing returning to the coordinates of the preceding point is detected, the chain decoding and splitting circuit 71 separates quantized coefficient information following positional information to thereby feed the quantized coefficient as a split quantized coefficient signal S56 to a coefficient output circuit 73 and feed a flag "1" as a coefficient change signal S57 to the coefficient output circuit 73. Otherwise, the chain decoding and splitting circuit 71 feeds "0" as the split quantized coefficient signal S56 to the coefficient output circuit 73 and feeds a flag "0" as the coefficient change signal S57 to the coefficient output circuit 73.

The coefficient output circuit 73 outputs the quantized coefficient of the preceding feature point as the quantized coefficient signal S58 of the current feature point when the coefficient change signal S57 is "0", and the coefficient output circuit 73 outputs the split quantized coefficient signal S56 as the quantized coefficient S58 of the current feature point when the coefficient change signal S57 is "1".

The quantized coefficient signal S58 is stored in an address of the frame buffer 72 designated by the addressing signal S55, so that the quantized coefficient signal S58 thus accumulated are outputted as a split output circuit output signal S59 in the order of line scanning after processing for one scene is completed.

In the aforementioned configuration, when the quantized coefficient 1 of the current feature point is equal to the quantized coefficient 0 of the preceding current feature point as shown in FIG. 19B, the select multiplexing circuit 60 outputs the signal S54 without inserting the quantized coefficient 1 (corresponding to the direction 1) behind the direction 1 as shown in FIG. 19C.

On the contrary, when the value of the quantized coefficient 2 corresponding to the next direction 2 changes from the value of the quantized coefficient 1, not only a direction reverse to the direction 2 is inserted as a prohibited direction code behind the direction 2 but also the quantized coefficient 2 is added behind the inserted direction code before the resulting signal S54 is outputted.

Accordingly, when only continuous direction codes are supplied to the decoder side, a quantized coefficient which comes before the direction codes can be used as quantized coefficients corresponding to these direction codes, whereas when a prohibited direction code comes after a direction code, a quantized coefficient which comes just after the prohibited direction code can be used as a quantized coefficient corresponding to the direction code.

Thus, in the structure extraction encoder using the select multiplexing circuit 60 of this embodiment, when feature point quantized coefficients of the same value appear continuously, the quantized coefficients can be expressed by encoding only one quantized coefficient so that codes can be reduced in quantity correspondingly to the number of omitted quantized coefficients.

According to the above configuration, the quantized coefficient at the current feature point is not subjected to coding when the value of the quantized coefficient at the preceding feature point is equal to the value of the quantized coefficient at the current feature point. Accordingly, the number of codes can be reduced.

(4) Other Embodiments

The aforementioned embodiment is described upon the case where direction codes C0 to C7 are arranged at intervals of 45[°] are used as the direction codes. However, this invention is not only limited to this, but the same effect as in the aforementioned case can be attained also in the case where direction codes are arranged at intervals, for example, of 90[°] or 30[°] are used.

Further, the first embodiment is described upon the case where direction displacement component codes (for example, D0) are assigned code words respectively so that a code word which is smaller in the number of bits corresponds to a direction displacement component code which is smaller in the displacement of direction. However, this invention is not only limited to this, but is applicable to the case where direction displacement component codes are assigned to code words in a manner so that a code word smaller in the number of bits corresponds to a direction displacement component code higher in the probability of generation.

Further, the second embodiment is described upon the case where a pattern having an acute change between two direction codes is detected and the two direction codes are replaced by one direction code. However, this invention is not only limited to this, but can be applied to the case where a pattern which is such that practically the reconstructed image is kept visually troubleless though the pattern is changed is detected from patterns of three or more continuous direction codes and replaced by another pattern composed of a smaller number of direction codes.

Further, the aforementioned embodiments is described upon the case where feature points are merely detected from an input image signal so as to be used for chain-coding information of the feature points. However, this invention is not only limited to this, but can be applied to the case where an input image signal is divided into a plurality of bands, for example, by sub-band coding, DCT (Discrete Cosine Transform), or the like, so that feature points are detected on the basis of coefficients of components of the bands obtained by the division so as to be used for chain-coding the information of the continuous feature points.

While there has been described in connection with the preferred embodiments of the invention, it will be obvious to those skilled in the art that various changes and modifications may be aimed, therefore to cover in the appended claims all such changes and modifications as fall within the true spirit and scope of the invention.

What is claimed is:

1. Apparatus for coding an input image signal which includes feature points defining an input image, comprising:

means for extracting chains of said feature points from said input image signal, each extracted chain including a sequence of first, second and third feature points;

means for determining a first direction of transition from said first feature point to said second feature point and for determining a second direction of transition from said second feature point to said third feature point;

means for generating a direction displacement code representing a difference between said first direction of transition and said second direction of transition; and means for variable length coding said direction displacement code as a function of said difference between said first direction of transition and said second direction of transition.

2. Apparatus according to claim 1, further comprising means for dividing said input image signal into a plurality of bands to enhance the extraction of said feature points.

3. Apparatus for coding an input image signal which includes feature points defining an input image, comprising:

means for extracting chains of said feature points from said input image signal, each extracted chain including a sequence of first, second and third feature points;

means for determining a first direction of transition from said first feature point to said second feature point and for determining a second direction of transition from said second feature point to said third feature point; and means for replacing said first and second directions of transition with a third direction of transition between said first feature point and said third feature point such that said second feature point is eliminated from each of the extracted chains, said third direction of transition being shorter than said first and second directions of transition combined.

4. Apparatus according to claim 3, wherein said first direction of transition is at an acute angle to said second direction of transition.

5. Apparatus according to claim 3, further comprising means for dividing said input image signal into a plurality of bands to enhance the extraction of said feature points.

6. Image signal coding apparatus for chain-coding feature points by detecting said feature points from an input image signal which includes respective amplitude values and positional information of said feature points, comprising:

means for comparing the respective amplitude value at a current feature point to the respective amplitude value at a preceding feature point;

means for generating a flag for indicating whether there is a change between the respective amplitude values at said current feature point and at said preceding feature point, respectively;

means for encoding only said positional information at said current feature point if the respective amplitude value at said current feature point substantially equals the respective amplitude value at said preceding feature point, and for encoding the respective amplitude value at said current feature point if the respective amplitude value at said current feature point substantially differs from the respective amplitude value at said preceding feature point, based on said flag; and means for multiplexing said encoded positional information and said encoded amplitude value at said current feature point if the respective amplitude value at said current feature point substantially differs from the respective amplitude value at said preceding feature point, based on said flag.

7. Apparatus according to claim 6, further comprising means for coding a direction of transition from said current feature point to said preceding feature point, and wherein said means for multiplexing multiplexing said direction of transition, said encoded positional information and said encoded amplitude value at said current feature point if the respective amplitude value at said current feature point substantially differs from the respective amplitude value at said preceding feature point.

8. Apparatus according to claim 6, further comprising means for dividing said input image signal into a plurality of bands to enhance the detection of said feature points.

9. Image signal decoding apparatus for decoding a coded image represented by an input image signal, said coded image obtained by means for extracting feature points as chains from said input image signal, an extracted chain including a sequence of first, second and third feature points, by means for determining a first direction of transition from said first feature point to said second feature point, and for determining a second direction of transition from said second feature point to said third feature point, by means for generating a direction displacement code representing a difference between said first direction of transition and said second direction of transition, and by means for variable length coding said direction displacement code as a function of said difference between said first direction of transition and said second direction of transition, said image signal decoding apparatus comprising:

means for variable length decoding said direction displacement code; and means for obtaining a position for each of said first, second and third feature points based on the variable length decoded direction displacement code.

10. An image signal decoding method for decoding coded data which is obtained by detecting feature points from an input image signal, coding only the component of direction from the preceding feature point to the current feature point without encoding the amplitude value at the current feature point when there is no change between the amplitude value at the current feature point and the amplitude value at a preceding feature point, and coding the component of direction from the preceding feature point to the current feature point, the component of direction from the current feature point to the preceding feature point, and the amplitude value at the current feature point when there is some change between the amplitude value at the current feature point and the amplitude value at the preceding feature point, comprising the steps of:

detecting whether the component of direction from said current feature point to the preceding feature point is included in said coded data;

decoding the current feature point by using the amplitude value of the preceding feature point, when there is no component of direction from said current feature point to the preceding feature point; and decoding the current feature point by using the amplitude value of the current feature point, when there is some component of direction from said current feature point to the preceding feature point.

11. A method of coding an input image signal which includes feature points defining an input image, comprising the steps of:

extracting chains of said feature points from said input image signal, each extracted chain including a sequence of first, second and third feature points;

determining a first direction of transition from said first feature point to said second feature point;

determining a second direction of transition from said second feature point to said third feature point;

generating a direction displacement code representing a difference between said first direction of transition-and said second direction of transition; and variable length coding said direction displacement code as a function of said difference between said first direction of transition and said second direction of transition.

12. The method according to claim 11, further comprising dividing said input image signal into a plurality of bands to enhance the extraction of said feature points.

13. A method of coding an input image signal which includes feature points defining an input image, comprising the steps of:

extracting chains of said feature points from said input image signal, each extracted chain including a sequence of first, second and third feature points;

determining a first direction of transition from said first feature point to said second feature point;

determining a second direction of transition from said second feature point to said third feature point; and replacing said first and second directions of transition with a third direction of transition between said first feature point and said third feature point such that said second feature point is eliminated from each of the extracted chains, said third direction of transition being shorter than said first and second directions of transition combined.

14. The method according to claim 13, wherein said first direction of transition is at an acute angle to said second direction of transition.

15. The method according to claim 13, further comprising dividing said input image signal into a plurality of bands to enhance the extraction of said feature points.

16. An image signal coding method for chain coding feature points by detecting said feature points from an input image signal which includes respective amplitude values and positional information of said feature points, said method comprising the steps of:

comparing the respective amplitude value at a current feature point to the respective amplitude value at a preceding feature point;

generating a flag for indicating whether there is a change between the respective amplitude values at said current feature point and at said preceding feature point, respectively;

encoding only said positional information at said current feature point if there is no change between said amplitude values at said current feature point and at said preceding feature point, respectively, based on said flag; and if there is a change between said amplitude values at said current feature point and at said preceding feature point based on said flag, encoding said amplitude value at said current feature point and multiplexing said encoded positional information and said encoded amplitude value at said current feature point.

17. The method according to claim 16, further comprising coding a direction of transition from said current feature point to said preceding feature point, and multiplexing said direction of transition, said encoded positional information and said encoded amplitude value at said current feature point if there is a change between said amplitude values at said current feature point and at said preceding feature point.

18. The method according to claim 16, further comprising dividing said input image signal into a plurality of bands to enhance the detection of said feature points.

19. An image signal decoding method for decoding a coded image represented by an input image signal, said coded image obtained by extracting feature points as chains from said input image signal, an extracted chain including a sequence of first, second and third feature points, by determining a first direction of transition from said first feature point to said second feature point, by determining a second direction of transition from said second feature point to said third feature point, by generating a direction displacement code representing a difference between said first direction of transition and said second direction of transition, and by variable length coding said direction displacement code as a function of said difference between said first direction of transition and said second direction of transition, said image signal decoding method comprising the steps of:

variable length decoding said direction displacement code; and obtaining a position for each of said first, second and third feature points based on the variable length decoded direction displacement code.

* * * * *